United States Patent
Torrent et al.

(10) Patent No.: US 11,407,177 B2
(45) Date of Patent: Aug. 9, 2022

(54) TRACKING COOLING TIME FOR 3D PRINTING TROLLEY

(71) Applicant: HEWLETT-PACKARD DEVELOPMENT COMPANY, L.P., Houston, TX (US)

(72) Inventors: Anna Torrent, Barcelona (ES); Sergio de Santiago Dominguez, Barcelona (ES); Marina Ferran Farres, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 777 days.

(21) Appl. No.: 16/076,249

(22) PCT Filed: May 12, 2016

(86) PCT No.: PCT/US2016/032138
§ 371 (c)(1),
(2) Date: Aug. 7, 2018

(87) PCT Pub. No.: WO2017/196348
PCT Pub. Date: Nov. 16, 2017

(65) Prior Publication Data
US 2021/0187857 A1 Jun. 24, 2021

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/357* (2017.08); *B29C 64/379* (2017.08);
(Continued)

(58) Field of Classification Search
CPC ................... B29C 64/386–393; B29C 64/165
See application file for complete search history.

(56) References Cited

U.S. PATENT DOCUMENTS 5,622,577 A * 4/1997 O'Connor .............. B33Y 40/00
156/62.2
6,399,010 B1 6/2002 Guertin et al.
(Continued)

FOREIGN PATENT DOCUMENTS

CN 204725859 U 10/2015
EP 1700686 B1 9/2006
(Continued)

OTHER PUBLICATIONS

Rannar et al; "Efficient Cooling with Tool Inserts Manufactured by Electron Beam Melting"; 2007; http://www.emeraldinsight.com/doi.abs/10.1108/13552540710750870.

*Primary Examiner* — Matthew J Daniels
*Assistant Examiner* — Andrew L Swanson
(74) *Attorney, Agent, or Firm* — HP Inc. Patent Department

(57) ABSTRACT

In example implementations, an apparatus includes an interface. The interface is to detect a connection to a 3D printer and a connection to a powder supply/post-processing component. The interface may be in communication with a processor. The processor may also be in communication with a timer. The timer is to begin tracking a cooling time when the interface is disconnected from the 3D printer and the processor is to transmit the cooling time to the powder supply/post-processing component when the interface detects the connection to the powder supply/post-processing component.

14 Claims, 4 Drawing Sheets

(51) Int. Cl.
*B33Y 30/00* (2015.01)
*B33Y 50/02* (2015.01)
*B29C 64/357* (2017.01)
*B29C 64/379* (2017.01)
B29C 64/25 (2017.01)
B29C 64/255 (2017.01)
B29C 64/259 (2017.01)

(52) U.S. Cl.
CPC .............. *B33Y 10/00* (2014.12); *B33Y 30/00* (2014.12); *B33Y 50/02* (2014.12); *B29C 64/25* (2017.08); *B29C 64/255* (2017.08); *B29C 64/259* (2017.08)

(56) References Cited

U.S. PATENT DOCUMENTS

| | | | | |
|---|---|---|---|---|
| 6,554,600 | B1* | 4/2003 | Hofmann | B29C 64/259 425/174.4 |
| 7,790,096 | B2 | 9/2010 | Merot et al. | |
| 2007/0057412 | A1* | 3/2007 | Weiskopf | B33Y 10/00 264/497 |
| 2008/0166480 | A1 | 7/2008 | Kritchman | |
| 2010/0155985 | A1* | 6/2010 | McAlea | B29C 35/16 264/113 |
| 2010/0193480 | A1 | 8/2010 | Adams | |
| 2011/0285061 | A1* | 11/2011 | McAlea | B33Y 10/00 264/401 |
| 2012/0251829 | A1 | 10/2012 | Xu et al. | |
| 2013/0000553 | A1* | 1/2013 | Hoechsmann | B29C 64/357 118/708 |
| 2013/0004607 | A1* | 1/2013 | Hoechsmann | B22F 12/00 425/112 |
| 2015/0328838 | A1 | 11/2015 | Erb et al. | |
| 2018/0136632 | A1* | 5/2018 | Ochiai | B33Y 50/02 |

FOREIGN PATENT DOCUMENTS

| | | |
|---|---|---|
| KR | 10-0809059 | 3/2008 |
| WO | WO-2015051332 | 4/2015 |
| WO | WO-2016-009426 | 1/2016 |
| WO | WO-2016053303 | 4/2016 |

* cited by examiner

TRACKING COOLING TIME FOR 3D PRINTING TROLLEY

BACKGROUND

Three dimensional (3D) printers are becoming more ubiquitous as costs for the printers come down. 3D printers, also referred to as additive manufacturing machines, typically operate by using a material to generate a 3D object layer-by-layer. For example, a layer of material is provided onto a build platform and leveled. Portions of the layer of material are printed with a fusing agent and then fused by applying energy to the layer of material. The layer of material may be lowered on the build platform and a new layer of material may be added on top of the previous layer. The process may be repeated until the entire 3D part is printed or built.

After a part is printed on the 3D printer, the part is allowed to cool before post-processing the part. Post-processing of the part may include de-caking, capturing the removed material for recycling, and the like.

DETAILED DESCRIPTION

The present disclosure discloses methods and apparatuses for determining a cooling time of a 3D printed part. One parameter used for a 3D printing process to ensure the part is processed properly is the cooling time of the part after printing, but before the post-processing. Inefficiencies can result when the cooling time is not tracked, or not tracked accurately, and provided.

In one implementation, the cooling time may be automatically tracked and transmitted to the powder supply/post-processing component. As a result, the powder supply/post-processing component may verify that a sufficient cooling time has elapsed for a particular 3D part before performing the post-processing of the 3D part.

In some implementations, a battery may be coupled to a timer on the trolley that tracks the cooling time. For example, when the part is printed on a movable printing platform, the movable printing platform may have no power when disconnected from various components of the 3D printing system. The battery may power the timer to allow the cooling time to be tracked even when the trolley is disconnected from a power source such as the printer or the powder supply/post-processing component.

As a result, the present disclosure improves previous methods that had the operators manually write down cooling times on a chart. However, the times may not be accurate, the wrong time may be inadvertently written down, or the operator may incorrectly calculate the cooling time from the start time and a current time. As a result, without any verification of the cooling time by the powder supply/post-processing component, the 3D part may be processed prematurely.

In some instances, the cooling time may not be tracked at all and operators may not know which parts are ready for post processing. Operators may have to manually check a temperature of the part to determine if the part has been sufficiently cooled. To ensure sufficient cooling the part may be kept on the movable printing platform for an excess amount of time, which may lead to slower overall processing times.

Thus, the present disclosure provides an automated process to track the cooling time and transmit the cooling time to the powder supply/post-processing component for verification before post-processing the part. As a result, the part may be processed after printing as soon as the part is sufficiently cooled. In addition, the operators may know which trolley to post-process and the efficiency of the entire 3D printing process may be improved.

Figure 1:
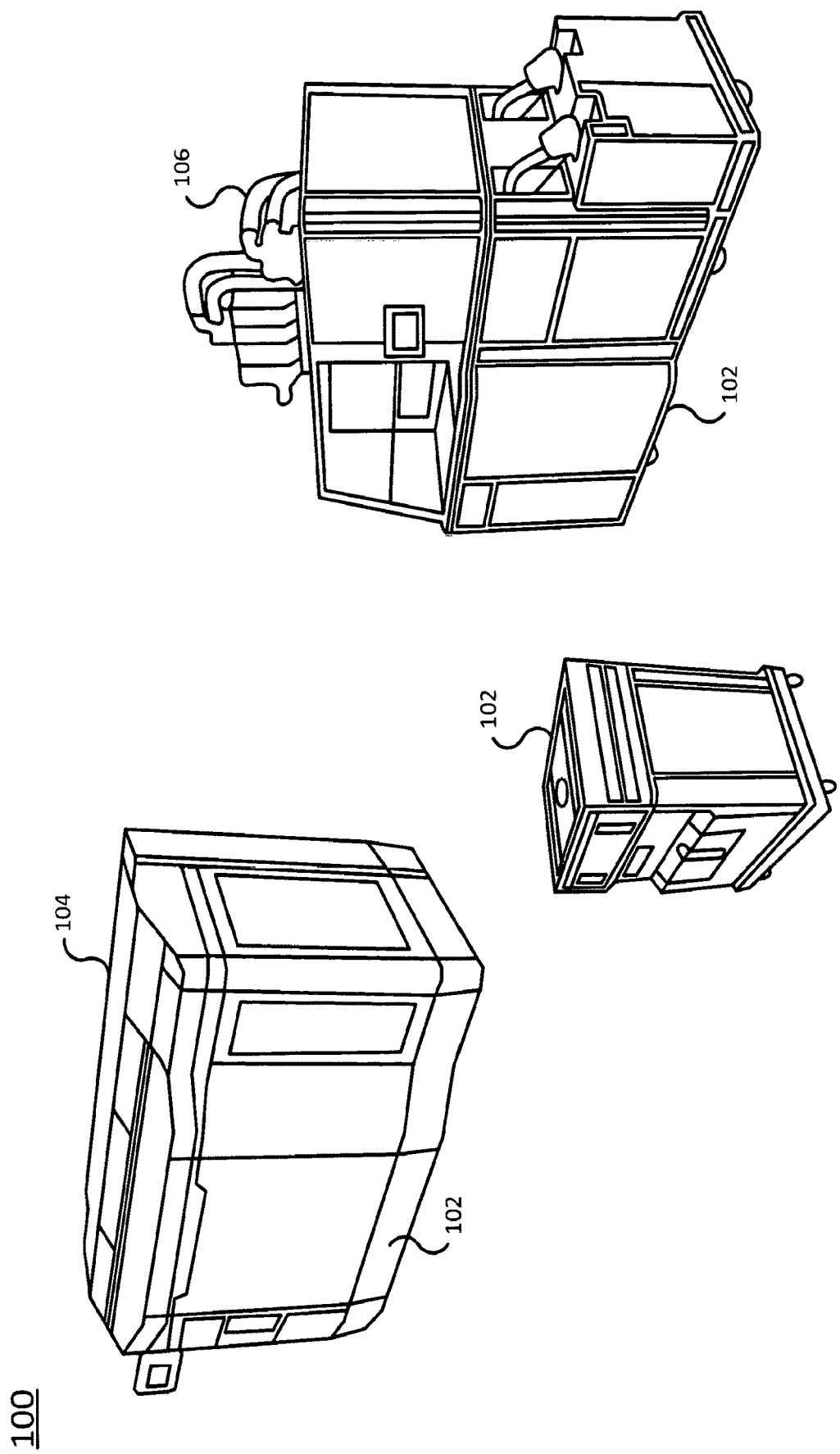
FIG. 1 is a block diagram of a side view of an example of a 3D printing system of the present disclosure.

FIG. 1 illustrates an example of a 3D printing system 100. The 3D printing system may include a trolley 102, a printer or 3D printer 104 and a powder supply/post-processing component 106. In one implementation, the trolley 102 may store a build material (e.g., a metallic or ceramic powder) that is used to build a part using additive printing/processing layer by layer. In addition, the trolley 102 may provide a build platform upon which the part is built. The build material may be delivered up from the sides of the trolley 102 onto the build platform. The build platform may move lower after each layer is printed.

In one example, the trolley 102 may be connected to the powder supply/post-processing component 106 to receive the build material. For example, FIG. 1 shows the powder supply/post-processing component 106 with the trolley 102 connected.

After the trolley 102 receives the build material, the trolley 102 may be disconnected from the powder supply/post-processing component 106 and connected to the printer 104. FIG. 1 shows the printer 104 with the trolley 102 connected.

In some implementations, the printer 104 may have a first print head for applying a fusing agent to areas of the build material that will be fused to print a layer of the part that is being printed. The first print head may also apply a detailing agent on some areas of the build material to help prevent the build material from fusing in the areas that will not be fused. Then the printer 104 may have a second print head that applies energy to fuse the areas of the build material with the fusing agent. The build platform of the trolley 102 may be lowered and a new layer of build material may be added on top of the layer of build material that was printed. The process may be repeated until the part is completed.

The trolley 102 may be removed from the printer 104 after printing of the part has completed. The trolley 102 can then be connected to the powder supply/post-processing component 106 again to extract the part. In addition, the powder supply/post-processing component 106 may also recover and recycle the unfused build material.

Figure 2:
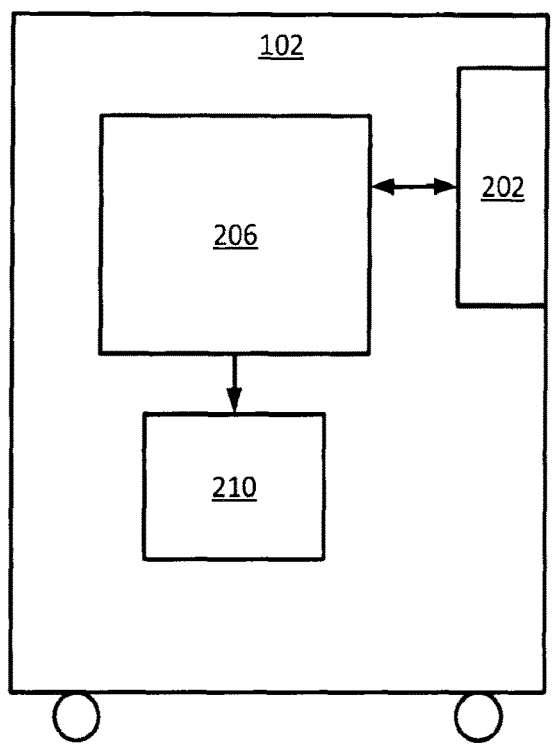
FIG. 2 is a block diagram of an example trolley of the 3D printing system of the present disclosure.

However, before the trolley 102 can be connected to the powder supply/post-processing component 106, the part is cooled. FIG. 2 illustrates an example block diagram of the trolley 102 that has an interface 202, a processor 206 and a timer 210. In one implementation, the processor 206 may be in communication with the interface 202 and the timer 210. The interface 202 may detect a connection to a 3D printer or a powder supply/post-processing component.

The interface 202 may comprise an electro-mechanical connection that includes wiring for communication to pass between the 3D printer 104 or the powder supply/post-processing component 106 and the processor 206 in the trolley 102. In another example, the interface 202 may provide a wireless communication path between the 3D printer 104 or the powder supply/post-processing component 106 and the processor 206 in the trolley 102.

Although a single interface 202 is illustrated in FIG. 2, it should be noted that the interface 202 may be deployed as two different interfaces. For example, a first interface may detect a connection to the 3D printer 104 and the second interface may detect a connection to the powder supply/post-processing component 106.

In one example, the timer 210 may be used to track a cooling time for a part that is built on the trolley 102. The timer 210 may communicate or transmit the cooling time to the processor 206.

In one implementation, in response to the disconnection from the 3D printer 104 being detected, the processor 206 may activate the timer 210. The timer may begin tracking the cooling time that has elapsed since the trolley 102 was disconnected from the 3D printer 104.

In one implementation, the timer 210 may continue to track the cooling time until the interface 202 detects a connection to the powder supply/post-processing component 106. In one example, the cooling time may be transmitted to the powder supply/post-processing component 106. If the cooling time is greater than a cooing time threshold, the post supply/post-processing component 106 may accept the connection and send a signal via the interface 202 to the processor 206 indicating that the connection was accepted. In response, the processor 206 may deactivate the timer 210 to stop tracking the cooling time.

Figure 3:
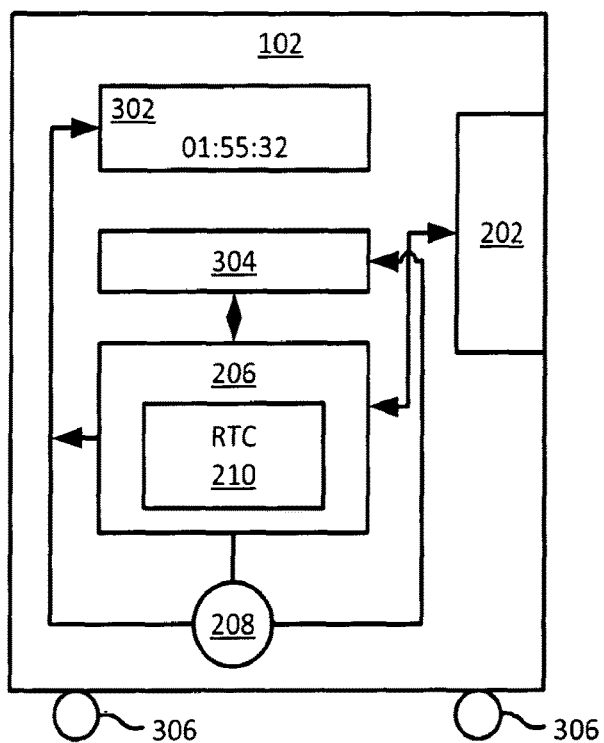
FIG. 3 is a more detailed block diagram of an example trolley of the 3D printing system of the present disclosure.

FIG. 3 illustrates an example of a more detailed block diagram of the trolley 102. In one example, the trolley 102 may have wheels 306 to move the trolley 102 between the printer 104 and the powder supply/post-processing component 106.

In one implementation, trolley 102 may include a memory 304. The memory 304 may be a non-transitory computer readable storage medium such as, a read access memory (RAM), hard disk drive, and the like. The processor 206 may store the cooling time in the memory 304 for later access and retrieval. In one example, the processor 206 may periodically update the cooling time stored in the memory 304 as the cooling time is tracked.

In one implementation, the trolley 102 may include a display 302. The display 302 may also be coupled to processor 206. The display 302 may be used to display the cooling time. The display 302 may show hours, minutes and seconds. In one implementation, an operator may press a cooling time display button that may retrieve the cooling time stored in the memory 304 to be displayed in the display 302. In another example, the display 302 may continuously display the cooling time in real time as the processor 206 is tracking the cooling time via the real-time clock (RTC) 210.

In another example, the display 302 may be an e-ink display. Just before an operator removes the trolley 102 from the 3D printer 104, the current time may be written to the e-ink display. The cooling time that is calculated may also be shown on the e-ink display. With this information the operator may know when the trolley 102 is ready to be post-processed to uncake the part on the trolley 102.

In one example, many trolleys 102 may be deployed. After a part is printed onto each one of the trolleys 102, the trolleys 102 may be parked for the part to cool. By tracking and providing the cooling time, an operator may know the cooling time for each part on each trolley 102. As a result, the operator may know which trolley 102 to process.

In one implementation, the timer 210 may be a real-time clock (RTC) of the processor. For example, the RTC may keep a current time. In one implementation, the timer 210 may be powered by a battery 208 when the trolley 102 is disconnected from the 3D printer 104 or the powder supply/post-processing component 106.

In one example, when the timer 210 is an RTC, the processor 206 may activate the battery 208 when the interface 202 is disconnected from the 3D printer 104 after the part is completed. The processor 206 may then store the current time of the RTC 210. Once the interface 202 is disconnected from the 3D printer 104, the processor 206 may switch power to the battery 208. In one example, a switch may be electronically triggered on and off automatically for the processor 206 in response to the disconnection from the interface 202 to activate and deactivate the battery 208. In another example, the battery 208 may constantly provide power to the RTC 210 and the processor 206 may begin tracking the cooling time once the disconnection from the 3D printer 104 is detected.

The processor 206 may track the cooling time via the RTC 210 that is powered by the battery 208. In one example, the time that the processor 206 detects that the interface 202 is disconnected from the 3D printer 104 may be the start of the cooling time. The cooling time may be the current time of the RTC 210 minus the start of the cooling time.

In one implementation, the battery 208 may continue to power the RTC 210 and the processor 206 may continue to track the cooling time until the interface 202 detects a connection to the powder supply/post-processing component 106. In one example, the cooling time may be transmitted to the powder supply/post-processing component 106. If the cooling time is greater than a cooing time threshold, then the processor 206 may deactivate the battery 208 or simply stop tracking the cooling time.

In one example, the timer 210 or the cooling time stored in the memory 304 may be reset to 0 when the interface detects a connection to the 3D printer 104 or a disconnection from the powder supply/post processing component 106. In another implementation, the timer 210 or the cooling time stored in the memory 304 may be reset to 0 when the processor 206 receives an indication that the connection to the powder supply/post processing component 106 has been accepted.

Figure 4:
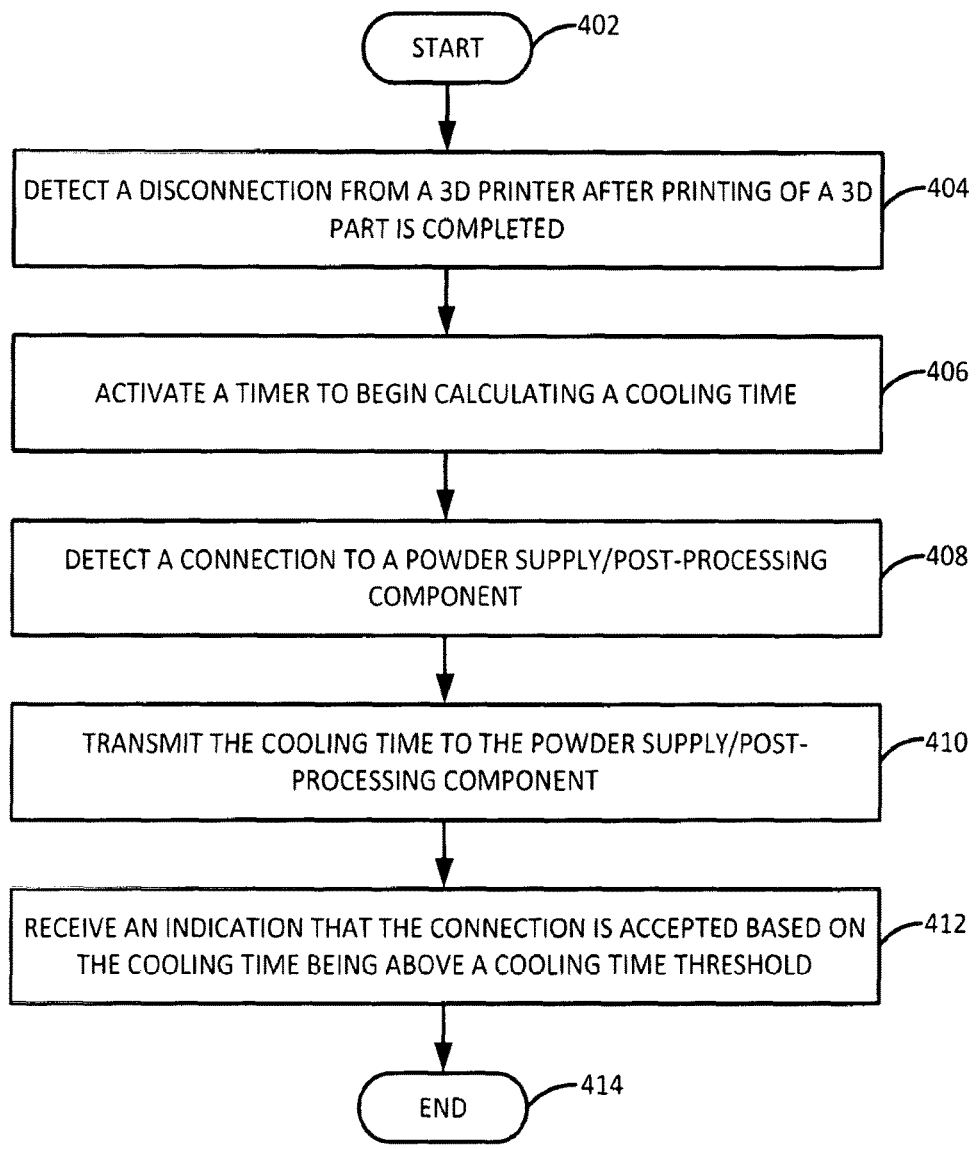
FIG. 4 is a flow diagram of an example method for determining cooling time of a 3D printed part.

FIG. 4 illustrates a flow diagram of an example method 400 for determining a cooling time of a 3D printed part. In one example, the blocks of the method 400 may be performed by the processor 206 of the trolley 102.

At block 402, the method 400 begins. At block 404, the method 400 detects a disconnection from a 3D printer after printing of a 3D part is completed. For example, an interface of the trolley may detect a connection to a corresponding interface on the 3D printer. The interface may detect when the interface is disconnected from the corresponding interface on the 3D printer. A signal (e.g., a disconnection signal may be transmitted, a signal indicating that the connection is made may be interrupted, and the like) may be detected by the processor of the trolley.

At block 406, the method 400 activates a timer to begin calculating a cooling time. In response to detecting the disconnection from the 3D printer, the timer may be activated. The timer may begin tracking the cooling time.

In one implementation, the timer may be an RTC of the processor that tracks a current time. The RTC may be battery operated. In one example, when the disconnection from the 3D printer is detected, the processor may activate the battery to power the RTC. For example, an electronic switch that turns the battery on and off may be turned on by the processor.

After the battery is activated, the processor may begin tracking a cooling time of the part on the trolley using the RTC in the processor that is powered by the battery. When the battery is activated, a time the battery was activated may be noted or stored in memory by the processor. In one example, the cooling time may be calculated based on a current time on the RTC less the time the battery was activated. In one implementation, the processor may continuously track the cooling time. In another implementation, the processor may periodically update the cooling time. For example, every ten minutes the processor may check the current time on the real-time clock and subtract the current time from the time the battery was activated.

In some implementations, the cooling time may be stored in memory of the trolley. In another implementation, the cooling time may be displayed. In one example, the cooling time may be continuously displayed as the processor track the cooling time in real-time. In another example, the cooling time may be displayed when an operator requests the current cooling time by pressing a button on the trolley that accesses the cooling time stored in memory in the trolley.

At block 408, the method 400 detects a connection to a powder supply/post-processing component. For example, the interface may detect the connection to the powder supply/post-processing component.

At block 410, the method 400 transmits the cooling time to the powder supply/post-processing component. For example, the cooling time may be retrieved from memory and transmitted via the interface to the powder supply/post-processing component. In another example, the cooling time kept in real-time by the timer is communicated to the processor. The processor may then transmit the cooling time to the powder supply/post-processing component (e.g., via the interface).

In one example, the powder supply/post-processing component may compare the cooling time to a cooling time threshold. The cooling time threshold may vary depending on the type of build material that is used to build the part, the size of the part, and the like. For example, the cooling time threshold may be several minutes (e.g., 30 minutes, 55 minutes, and the like), several hours (e.g., 1 hour, 5 hours, 15 hours, and the like), several hours and minutes (e.g., 2 hours and 33 minutes, 4 hours and 45 minutes, and the like), a day, or any other amount of time. If the cooling time is equal to or greater than the cooling time threshold, then the connection to the powder supply/post-processing component may be accepted. As a result, the cooling time may be transmitted to the powder supply/post-processing component to verify that the part has cooled sufficiently before performing post-processing on the part.

When the connection is accepted, the processor of the trolley may reset the cooling time to zero. For example, the cooling time stored in the memory or the cooling time tracked by the timer may be reset to zero. As a result, the cooling time may be tracked again when the trolley is re-connected and disconnected from the printer for a subsequent part that is printed on the trolley. In another example, the cooling time may be reset to zero when the interface detects a connection to the 3D printer.

In one example, if the cooling time is below the cooling time threshold, then the connection to the powder supply/post-processing component may be rejected. For example, the powder supply/post-processing component may refuse to post-process (e.g., de-cake the part, reclaim and recycle the build material, etc.) the part in the trolley. If the connection is rejected, the cooling time may continue to be tracked by the timer or a RTC of the processor.

At block 412, the method 400 receives an indication that the connection is accepted based on the cooling time being above a cooling time threshold. For example, a signal may be provided to the processor of the trolley via the interface. In one implementation, a notification may be displayed on a display of the powder supply/post-processing component, and the like. At block 414, the method 400 ends.

Figure 5:
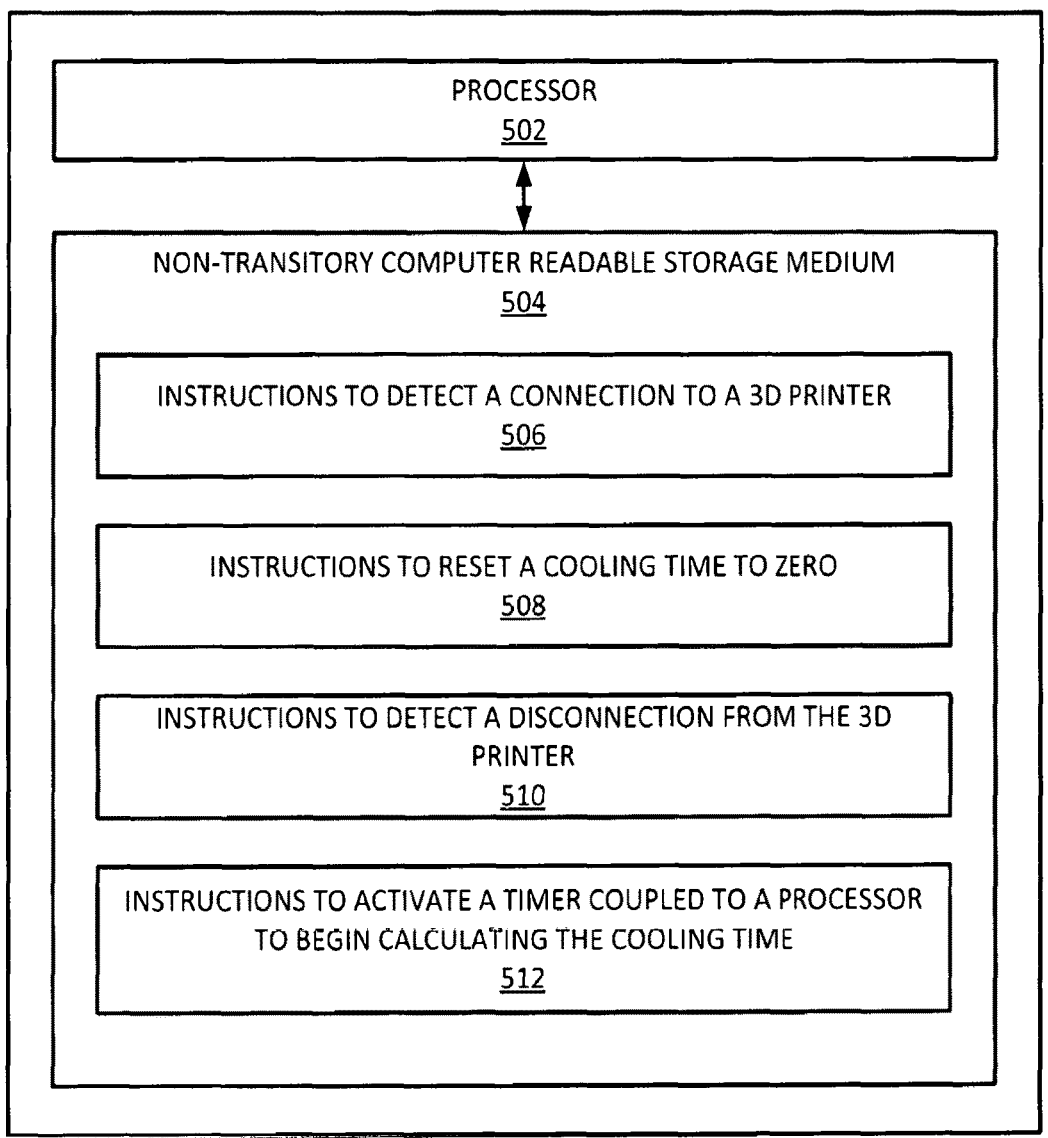
FIG. 5 is a block diagram of an example controller of the present disclosure.

FIG. 5 illustrates another example of an apparatus 500. In one example, the apparatus 500 may also be deployed in the trolley 102. In one example, the apparatus 500 may include a processor 502 and a non-transitory computer readable storage medium 504. The non-transitory computer readable storage medium 504 may include instructions 506, 508, 510 and 512 that when executed by the processor 502, cause the processor 502 to perform various functions.

In one example, the instructions 506 may include instructions to detect a connection to a 3D printer. The instructions 508 may include instructions to reset a cooling time to zero. The instructions 510 may include instructions to detect a disconnection from the 3D printer. The instructions 512 may include instructions to activate a timer coupled to a processor to begin calculating the cooling time.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
    an interface to interface the apparatus with a 3D printer or a powder supply/post-processing component, the interface also to detect a connection of the apparatus to a 3D printer and a connection of the apparatus to a powder supply/post-processing component;
    a processor in communication with the interface;
    a timer in communication with the processor, wherein the timer is to begin tracking a cooling time when the interface is disconnected from the 3D printer;
    the processor is programmed to transmit the cooling time to the powder supply/post-processing component when the interface detects the connection to the powder supply/post-processing component;
    the processor is programmed to activate the timer in response to detection of the interface being disconnected from the 3D printer; and
    the processor is programmed to deactivate the timer in response to a signal from the powder supply/post-processing component that connection with the apparatus has been accepted.

2. The apparatus of claim 1, comprising:
    a computer readable storage medium for storing the cooling time.

3. The apparatus of claim 2, further comprising a cooling time threshold based on a type of build material used or a size of a part being built.

4. The apparatus of claim 2, wherein the cooling time is reset when the interface detects the connection to the 3D printer or a disconnection from the powder supply/post processing component.

5. The apparatus of claim 1, comprising:
a display to display the cooling time.

6. The apparatus of claim 1, wherein the connection to the powder supply/post-processing component is rejected when the cooling time is below a cooling time threshold.

7. The apparatus of claim 1, wherein the timer comprises a real-time clock of the processor that is operated by a battery.

8. The apparatus of claim 1, further comprising a non-transitory computer readable storage medium encoded with instructions executable by the processor, the non-transitory computer-readable storage medium comprising:
instructions to detect a connection to a 3D printer;
instructions to reset a cooling time to zero;
instructions to detect a disconnection from the 3D printer; and
instructions to activate the timer to begin calculating the cooling time.

9. The apparatus with the non-transitory computer readable storage medium of claim 8, comprising:
instructions to detect a connection to a powder supply/post-processing component; and
instructions to receive an indication that the connection is accepted when the cooling time is above a cooling time threshold.

10. The apparatus with the non-transitory computer readable storage medium of claim 8, instructions to display the cooling time.

11. The apparatus of claim 1, further comprising a battery to power the timer.

12. The apparatus of claim 11, further comprising an electronically triggered switch to activate the battery in response to disconnection of the interface.

13. The apparatus of claim 1, wherein the interface comprises:
a first interface to make and detect the connection to a 3D printer; and
a second interface to make and detect the connection to a powder supply/post-processing component.

14. The apparatus of claim 5, wherein the display comprises an e-ink display.

* * * * *